United States Patent [19]

Langer et al.

[11] 4,048,363
[45] Sept. 13, 1977

[54] OFFSET LAMINATED INTUMESCENT MOUNTING MAT

[75] Inventors: Roger L. Langer, Troy Township, St. Croix County, Wis.; Alan J. Marlor, Minneapolis, Minn.

[73] Assignee: Minnesota Mining and Manufacturing Company, St. Paul, Minn.

[21] Appl. No.: 696,509

[22] Filed: June 16, 1976

[51] Int. Cl.² .............................................. B32B 3/00
[52] U.S. Cl. ...................................... 428/77; 428/57; 428/213; 428/354; 428/446; 428/539; 428/906; 428/913; 428/920
[58] Field of Search .......... 174/121 A, 170 R, 170 C; 229/3.5 R, 48 R, 4.5, 51 BD, 14 H; 220/75; 428/41, 77, 920, 921, 57–61, 189, 213, 215, 354, 446, 539, 906, 913; 162/145

[56] References Cited

U.S. PATENT DOCUMENTS

| | | | |
|---|---|---|---|
| 2,413,516 | 12/1946 | Pratt et al. | 106/122 |
| 2,484,608 | 10/1949 | Cheyney et al. | 229/14 H |
| 3,090,764 | 5/1963 | Ellis et al. | 260/42.44 |
| 3,117,902 | 1/1964 | Holzheimer | 428/41 |
| 3,144,193 | 8/1964 | Geist et al. | 229/3.5 R |
| 3,436,978 | 4/1969 | Rahmes | 428/77 |
| 3,916,057 | 10/1975 | Hatch et al. | 428/236 |

Primary Examiner—William J. Van Balen
Attorney, Agent, or Firm—Cruzan Alexander; Donald M. Sell; Temple Clayton

[57] ABSTRACT

At least two similar sheets of intumescent sheet material one of which is coated with adhesive on one face are adhered with an offset and with liner paper covering the exposed adhesive covered layer of the offset. Dimensions are made so that the laminate can be conformably wrapped around a ceramic monolith, the liner removed and the ends of the two laminate adhered. This provides ease of insertion of ceramic monoliths in coverings and after heating expansion of the intumescent material secures the monolith in the covering.

3 Claims, 4 Drawing Figures

OFFSET LAMINATED INTUMESCENT MOUNTING MAT

This invention relates to laminated intumescent sheet material and particularly to a laminate for convenient mounting of monolithic ceramic shapes in containers or casings.

It is known from U.S. Pat. No. 3,916,057 and from Ser. No. 520,675 filed Nov. 4, 1974 that intumescent sheet materials containing unexpanded vermiculite are valuable for mounting of monolithic shapes in containers and casings and for other situations where resistance to high temperatures with resiliency is required. It has heretofore been necessary to cut pieces and wrap the ceramic and then force the combination in the canister while preventing unrolling of the intumescent sheet covering.

An object of this invention is to simplify the mounting of shapes in containers, particularly monolithic shapes. Other objects will become evident hereinelsewhere.

In accordance with these and other objects of the invention a new article of manufacture is provided namely a mounting mat for application to refractory pieces and attaching therearound. The mounting mats of the invention are formed from at least two panels of intumescent sheet material about 0.5 to 2.0 mm thick having a width corresponding to one dimension of the refractory piece and lengths corresponding to the circumference or periphery of the piece in the other direction. Preferred intumescent sheet materials are those available according to U.S. Pat. No. 3,916,057 and Ser. No. 520,675 and particularly sheet materials comprising unexpanded vermiculite.

As an example of the construction of a mounting mat of the invention for a monolithic cylindrical ceramic piece 10.2 cm in diameter and 15.2 cm long and having longitudinal passageways, two pieces of intumescent sheet material are cut so that they are 15.2 cm wide and 31.4 up to 32.0 cm long. They may be slightly larger in width by about 0.5% but preferably the lengths are slightly less than the calculated circumference. Adhesive, suitably of the pressure-sensitive type described in RE 24,906 is applied to one sheet and a release liner as known in the adhesive art (such as silicone treated paper) about 2.5 cm wide is applied across one end to protect the adhesive. The other panel is then applied on the adhesive next to the strip of liner so that it extends free at the other end for about the same distance as the width of the liner. Preferred adhesives have very low or zero ash content and are further not obnoxious when burned off during expansion of the mat. It will be recognized that many types of adhesives may be used and that they may be applied as transfer adhesives, by coating operations, spraying or the like and may be agressive at ambient temperatures or may be heat or solvent activated.

Of course other procedures for manufacture may be used and what is described above is a simple manual procedure. Furthermore, several sheets may be laminated together congruently in any desired configuration, such as with machine directions at right angles, to provide greater thicknesses. Individual sheets may be cut manually or using dies and assembly may be manual or mechanical. It is further contemplated that supply rolls of intumescent material, liner and reservoirs of adhesive or adhesive applying means may be incorporated in mechanical means so that individual mounting mats of the invention are cut from the width of a continuously formed laminate. Other procedures will also occur to those skilled in the art.

The mounting mat is used by wrapping it around the refractory piece (cylindrical in this example) so that the free end of the one layer overlaps the portion of the other covered by release liner. The release liner is removed and the two ends are pressed together to effect bonding giving a substantially continuous laminate around the refractory piece. This is sufficiently secure that it need not be inserted immediately in a casing. This can be important on a production line where one worker may wrap and another insert in the casing or wrapping may be effected at a different site from insertion. Spaces between ends of either ply are not objectionable as they tend to be filled when the material is finally expanded and further a slight tolerance is helpful in fitting monoliths which deviate slightly from nominal dimensions.

It will be evident that the release liner is only used to protect the adhesive end and could even be omitted if the mounting pad is to be used immediately after assembly. It will also be evident that continuous rolls of such mats can be made in which free ends of two successive pads alternate with release liner ends of the same pads and adjacent ones in the roll. Other variations will be evident to those of skill in the art.

Having described the invention in general terms it is now more specifically described by the drawings herewith where FIG. 1 shows a mounting pad of the invention.

Figure 1:
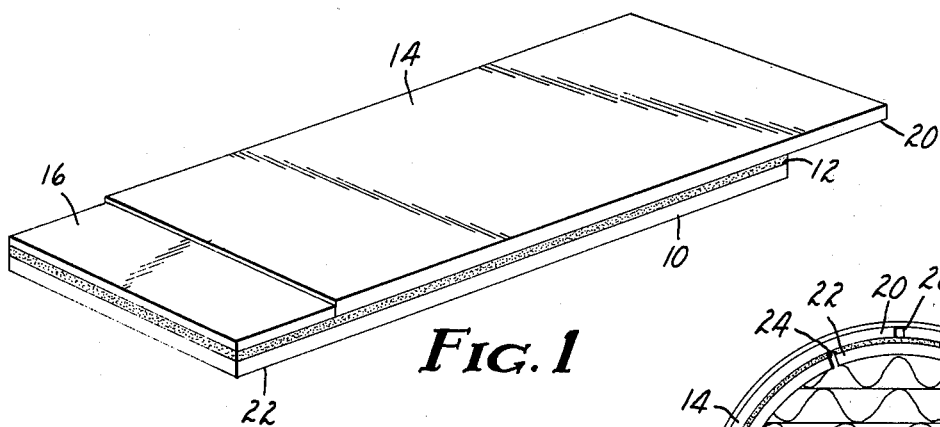
Figure 2:
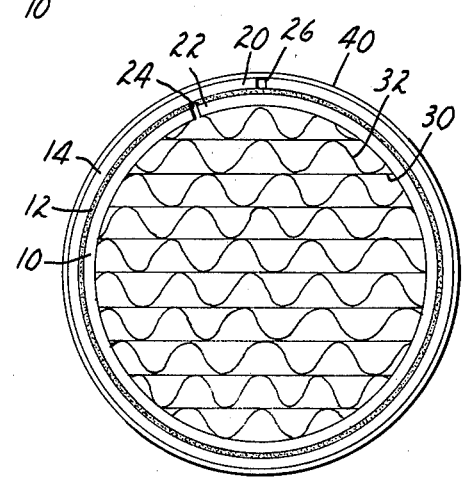
FIG. 2 shows a mounting pad of the invention applied to a cylindrical corrugated ceramic refractory inserted in a casing.

It will be seen in FIG. 1 that mounting pads of the invention are composed of a base sheet or first ply 10 having adhesive 12 thereon an applied sheet or second ply 14, having free end 20, adhered to part of said sheet 10 by adhesive 12 and release liner 16 adjacent said applied sheet 14 covering the free end 22 of said base sheet. In FIG. 2 it will be seen that ceramic piece 30 having longitudinal corrugations 32 is enwrapped in a mounting pad of the invention composed of layers 10 and 14 adhered by adhesive 12 and inserted in casing 40. Because the plies 10 and 14 are desirably made slightly shorter than the circumference of piece 30, gaps 24 and 26 are present before expansion of the mat.

Figure 3:
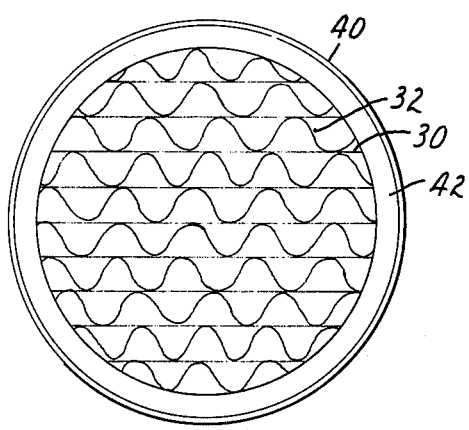
FIG. 3 shows a mounting pad of the invention as in FIG. 2 after heating to effect expansion of the intumescent material.

In FIG. 3 the same ceramic piece 30 in casing 40 is shown after heating and expansion of the mat. In this operation the adhesive layer 12 is volatilized and is not seen and layers 10 and 14 are expanded and differentiation is substantially lost to give mounting pad of expanded material 42. It will be seen that gaps 24 and 26 are also filled by the expanded material and are lost so that these features are not seen in FIG. 3.

Figure 4:
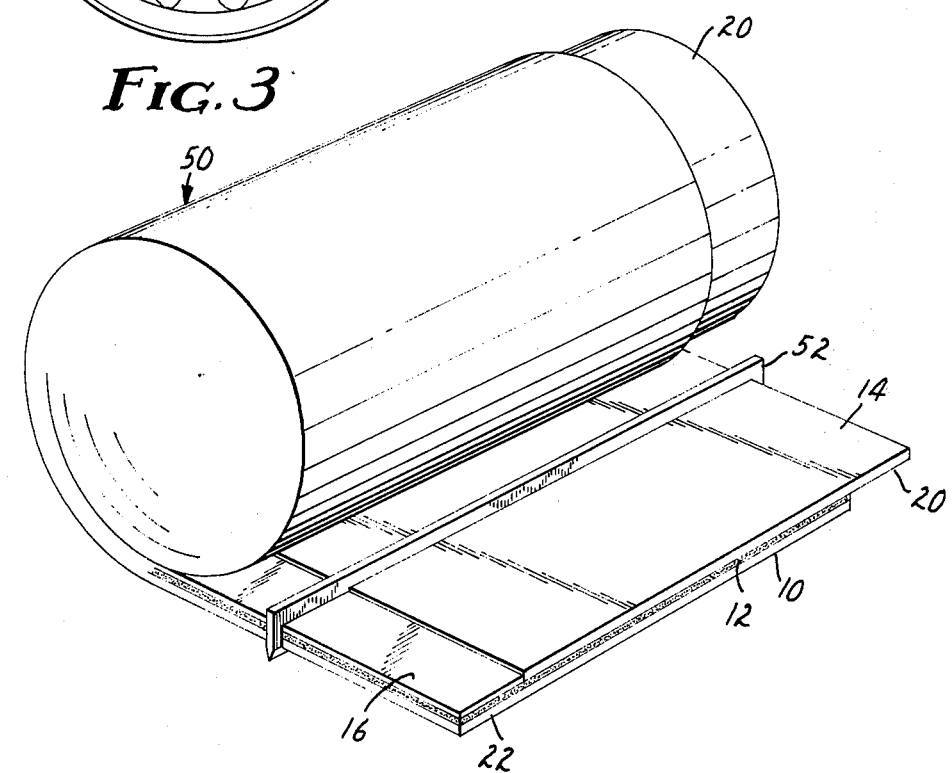
FIG. 4 shows a "jumbo" roll from which a mounting pad of the invention can be cut.

FIG. 4 shows diagrammatically a jumbo roll 50 from which knife blade 52 cuts mounting pads of the invention in which the parts are numbered as above.

What is claimed is:

1. As an article of manufacture an intumescent conforming mounting pad comprised of at least a first ply of intumescent sheet material having one adhesive-coated face and having ends and edges separated by predetermined dimensions and a second ply of intumescent sheet material of substantially the same dimensions as said first ply longitudinally displaced from one end of said first ply by a predetermined amount and adhered to the adhesive-coated face of said first ply leaving a free end of said first ply with exposed adhesive-coated face.

2. A mounting pad according to claim 1 wherein the free end of said first ply has a release liner on the exposed adhesive-coated face.

3. A mounting pad according to claim 1 wherein at least one additional ply is congruently laminated to at least one ply.

* * * * *